UNITED STATES PATENT OFFICE.

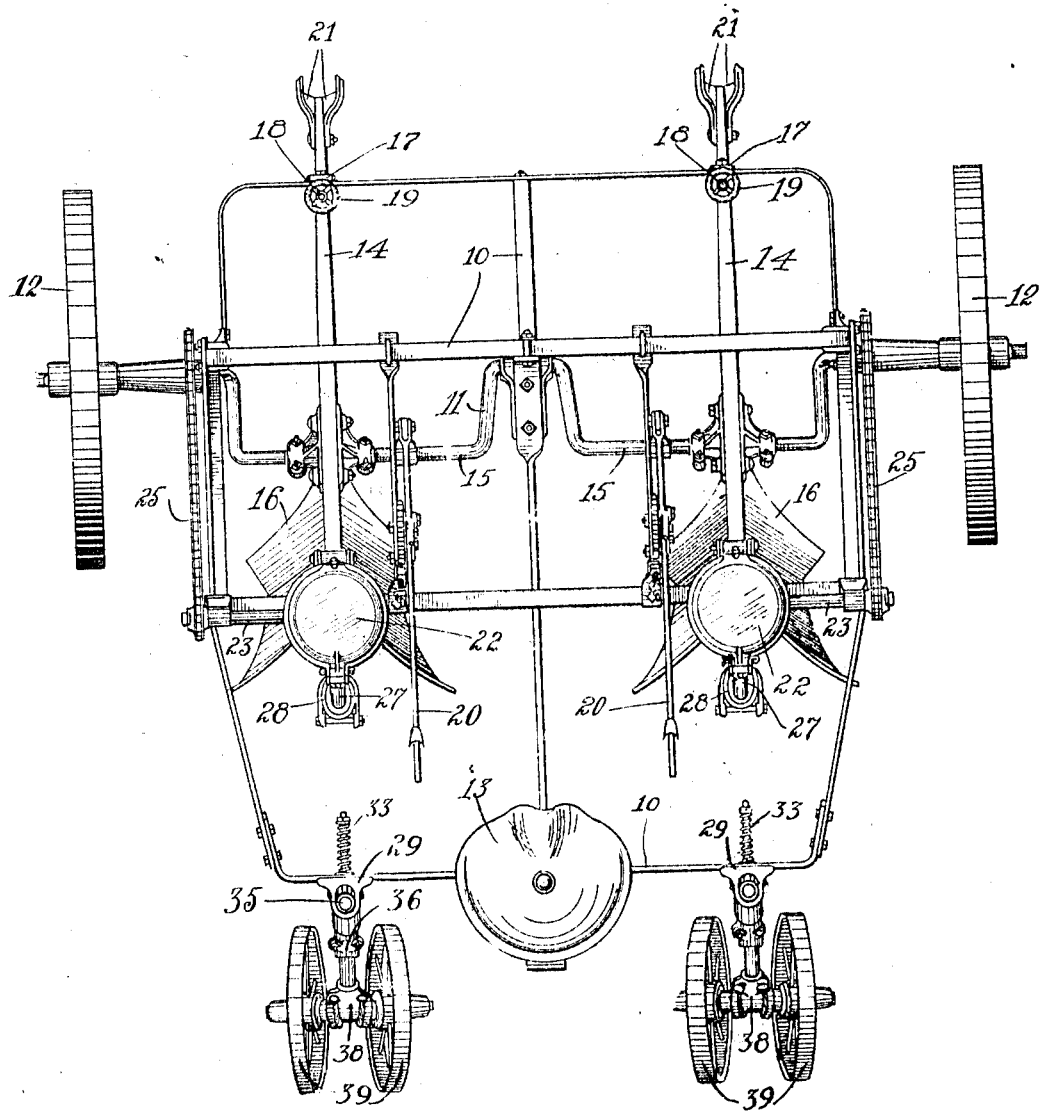

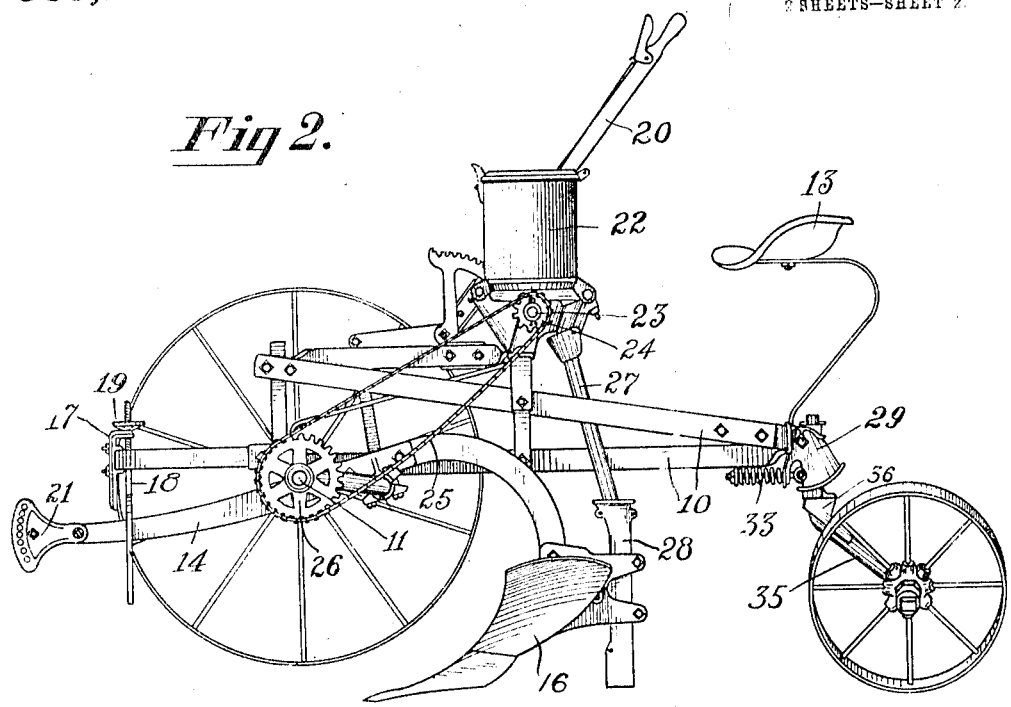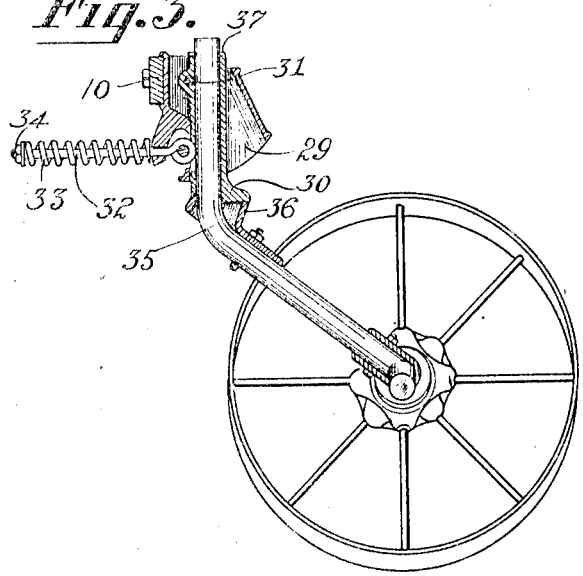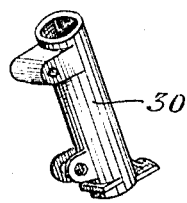

CURTIS L. HARBOLT, OF CANTON, ILLINOIS, ASSIGNOR TO PARLIN AND ORENDORFF COMPANY, OF CANTON, ILLINOIS, A CORPORATION OF ILLINOIS.

LISTER-PLOW.

965,295.

Specification of Letters Patent. Patented July 26, 1910.

Application filed January 6, 1910. Serial No. 536,609.

*To all whom it may concern:*

Be it known that I, CURTIS L. HARBOLT, a citizen of the United States, residing at Canton, in the county of Fulton, State of Illinois, have invented certain new and useful Improvements in Lister-Plows, of which the following is a specification, reference being had to the accompanying drawings.

This invention relates to lister plows, and has for its object to provide a new and improved mounting for the covering wheels. In plows of this class, it has been customary to provide two covering wheels mounted behind each of the sets of furrow opening and seed-dropping devices, said two covering wheels being mounted so as to turn together on a vertical axis like an ordinary caster-wheel. In use covering wheels so mounted have been successful under some conditions of work but the covering has not been so well done where the work has been on hilly or uneven ground.

It is the object of my invention to provide a new and improved construction which shall obviate the difficulties encountered in the old constructions. I accomplish this object by providing additional flexibility in the mounting of the covering wheels, this being attained in the construction shown by mounting the spindle at the lower end of which the covering wheels are journaled so as to turn in a sleeve which is mounted on a vertical pivot on the frame, a spring being provided for keeping the spindle more or less nearly in normal vertical position.

In the drawings:—Figure 1 is a top or plan view of a lister plow embodying my invention. Fig. 2 is a side view of the plow, with one of the carrying wheels broken away. Fig. 3 is an enlarged detail of one of the covering devices and the bracket by which it is attached to the frame of the machine, the bracket being shown in cross section, and one of the covering wheels being removed. Fig. 4 is an enlarged detail, being a view of the sleeve in which is mounted the spindle upon which the covering wheels are mounted.

Referring to the drawings:—10 indicates the framework of the machine, 11 an axle mounted therein, and 12 the carrying wheels mounted upon the axle.

13 indicates a seat suitably mounted on the frame.

14 indicates the plow beams which are suitably journaled upon off-set portions 15 of the axle.

16 indicates plow shares of the type ordinarily used in plows of this character attached to the rear ends of the beams 14.

17—18—19 indicate brackets, screw-threaded rods and nuts attached to the framework and to the plow beams near their forward ends by which the position of the forward ends of the plow beams relative to the frame may be varied, as will be readily understood.

20 indicates levers attached to the framework of the machine and to the off-set portions 15 of the axle 11 and provided with locking means whereby the portions 15 of the axle may be moved up or down relative to the frame and locked in position. By this means it will be understood the plows may be lifted clear of the ground, when desired, and by means of the levers in coöperation with the adjusting means 17—18—19, the plows may be adjusted downward to the desired extent and at the proper angle to cut to any predetermined depth.

21 indicates brackets or clevises of the ordinary type attached to the forward ends of the plow beams for draft purposes.

22 indicates seed boxes, each of which it will be understood is provided with a seed-dropping device of any suitable type adapted to be rotated by the seed-shaft 23 which in turn is rotated by means of the sprocket-wheel 24 fixedly secured on said shaft, sprocket-chain 25, and sprocket wheel 26 mounted upon the axle 11 so as to rotate with the wheel 12 adjacent thereto. Each seed box is provided with a seed-tube leading from the seed-box to a point directly behind the shares 16, each seed-tube comprising a tube 27 pivotally secured below the seed-box and a tube 28 fixedly secured to the beam 14, the tube 27 being adapted to telescope more or less into the tube 28 as the beam 14 is raised or lowered.

Inasmuch as the parts so far referred to are of ordinary construction and form of themselves no part of my present invention, it is believed that no further description of these parts will be required herein.

Coming now to the improved mounting of the covering wheels, 29 indicates brackets (see Fig. 1) secured to the frame of the machine at its rear end, one at each side of the machine, in the form of construction shown in the drawings the bracket 29 being in the form of a hollow casing. 30 indicates a sleeve pivoted at 31 in said bracket. 32 indicates a rod pivoted on said sleeve 30 below the pivot 31 and extending forward therefrom, passing through a suitable opening in the front face of the bracket 29.

33 indicates a strong coiled spring interposed between the front face of the bracket and a nut 34 screw-threaded upon the free end of the rod 32, said spring tending to maintain the sleeve 30 in the position shown in Fig. 3, but of course permitting the sleeve to be rocked backward more or less on the pivot 31 when any considerable force is applied thereto.

35 indicates a spindle of the ordinary type whose upper portion is vertical and the lower portion of which extends obliquely backward and downward.

36 indicates a bracket bolted or otherwise secured to the spindle 35 at the point of curvature, said bracket serving as a bearing against the sleeve 30 when the spindle is inserted therein.

37 indicates a cotter pin through the upper end of the spindle 35 to keep the spindle in position in the sleeve 30.

38 indicates a bracket fixedly secured upon the lower end of the spindle 35, upon which bracket are journaled in any approved manner covering wheels 39, which, as shown in Fig. 1, are inclined relative to each other, being farther apart at the top than at the bottom.

From the above description, it will be seen that when the covering wheels strike an obstruction the wheels can move relative to the rest of the machine without subjecting the whole machine to displacement or to the strain that would result if such covering wheels were rigidly mounted on the frame. It will also be appreciated that when the machine is being used on uneven ground the covering wheels will have a much greater tendency to remain in close contact with the ground where they can do effective work, the wheels on either side of the machine being held against the ground by the force of the spring even when the frame as a whole is abnormally elevated by reason of one or another of the remaining wheels passing over a bump.

What I claim as my invention and desire to secure by Letters Patent is:—

1. The combination with a frame, of a bracket mounted on said frame, said bracket being in the form of a hollow casing flaring toward its lower end, a sleeve pivotally mounted in said hollow bracket and adapted to swing forward and backward relative to said frame, a spindle rotatably mounted in said sleeve, a spring bearing on said bracket tending to hold said sleeve and spindle against backward movement relative to said frame, and covering wheels rotatably secured on said spindle.

2. In a lister plow, the combination with a frame, a plow share mounted thereon, and means for dropping seed in the furrow opened by said plow, of a bracket mounted on said frame, a sleeve pivotally mounted on said bracket and adapted to swing forward and backward relative to said frame, a rod pivotally attached to said sleeve below its said pivotal mounting on said bracket, said rod extending forward from said sleeve and passing through an opening in the bracket, a coiled spring mounted on said rod and bearing at its rear end against said sleeve, means on the free end of said rod for holding said spring compressed thereon, a spindle rotatably mounted in said sleeve, and a covering wheel journaled to said spindle.

3. In combination, a frame, a pair of carrying wheels mounted on said frame near the forward end thereof, a plurality of spindles each pivotally mounted near the rear end of said frame to swing forward and backward relative thereto and adapted also to turn axially, a pair of wheels journaled to each spindle and inclined relative to each other, said wheels being adapted to support the rear end of said frame, and yielding means tending to hold said spindles against swinging on said frame.

4. In a lister plow, the combination with a frame, carrying wheels mounted thereon near the forward end of said frame, a plurality of furrow-opening devices mounted on said frame, and means for dropping seed in each of the furrows, of a plurality of covering wheels one adapted to run in each furrow, and adapted to be raised and lowered relative to the frame, means connected with each covering wheel tending to hold it in its lowermost position relative to said frame.

5. In a lister plow, the combination with a frame, carrying wheels mounted thereon near the forward end of said frame, a plurality of furrow-opening devices mounted on said frame, and means for dropping seed in each of the furrows, of a plurality of spindles each pivoted to swing forward and backward relative to said frame and adapted also to turn axially, a covering wheel journaled to each spindle one adapted to run in each furrow, and yielding means tending to hold said spindles against swinging on said frame.

CURTIS L. HARBOLT.

Witnesses:
WM. S. GRAHAM,
FRED L. DEWEY.